(12) United States Patent
Agnihotri et al.

(10) Patent No.: US 7,738,778 B2
(45) Date of Patent: Jun. 15, 2010

(54) SYSTEM AND METHOD FOR GENERATING A MULTIMEDIA SUMMARY OF MULTIMEDIA STREAMS

(75) Inventors: Lalitha A. Agnihotri, Fishkill, NY (US); Nevenka Dimitrova, Yorktown Heights, NY (US)

(73) Assignee: IPG Electronics 503 Limited, St. Peter Port (GG)

( * ) Notice: Subject to any disclaimer, the term of this patent is extended or adjusted under 35 U.S.C. 154(b) by 1203 days.

(21) Appl. No.: 10/562,538

(22) PCT Filed: Jun. 28, 2004

(86) PCT No.: PCT/IB2004/051033
§ 371 (c)(1),
(2), (4) Date: Dec. 28, 2005

(87) PCT Pub. No.: WO2005/001715
PCT Pub. Date: Jan. 6, 2005

(65) Prior Publication Data
US 2006/0165379 A1 Jul. 27, 2006

Related U.S. Application Data

(60) Provisional application No. 60/483,765, filed on Jun. 30, 2003.

(51) Int. Cl.
*H04N 7/00* (2006.01)
(52) U.S. Cl. .................................. 386/98; 348/700
(58) Field of Classification Search .............. 386/98; 348/700
See application file for complete search history.

(56) References Cited

U.S. PATENT DOCUMENTS 6,100,941 A * 8/2000 Dimitrova et al. ............ 348/700
6,125,229 A 9/2000 Dimitrova et al.

FOREIGN PATENT DOCUMENTS

EP 0916120 A2 5/1999

OTHER PUBLICATIONS

Nevenka Dimitrova, et al: Classification of General Audio Data for Content-based Retrieval, Pattern Recognition Letters, vol. 22 No. 5, pp. 533-544.
Andrew Merlino, et al: Broadcast News Navigation Using Story Segmentation, ACM, Mitre Corp, 1997, pp. 381-389.
M. Stricker, et al: Similarity of Color Images, of IS&T/SPIE, SPIE Vol.,1995, SPIE 2420, pp. 381-392.

* cited by examiner

*Primary Examiner*—Marsha D Banks Harold
*Assistant Examiner*—Daniel Tekle
(74) *Attorney, Agent, or Firm*—Volpe and Koenig, P.C.

(57) ABSTRACT

A system facilitates and enhances review of one or more multimedia input streams that includes some combination of video, audio and text information, generating a multimedia summary, thereby enabling a user to better browse and/or decide on viewing the multimedia input streams in their entirety. The multimedia summary is constructed automatically, based in part on system specifications, user specifications and network and device constraints. In a particular application of the invention, the input multimedia streams represent news broadcasts (e.g., television news program, video vault footage). In such a particular application, the invention can enable the user to automatically receive a summary of the news stream in accordance with previously provided user preferences and in accordance with prevailing network and user device constraints.

27 Claims, 7 Drawing Sheets

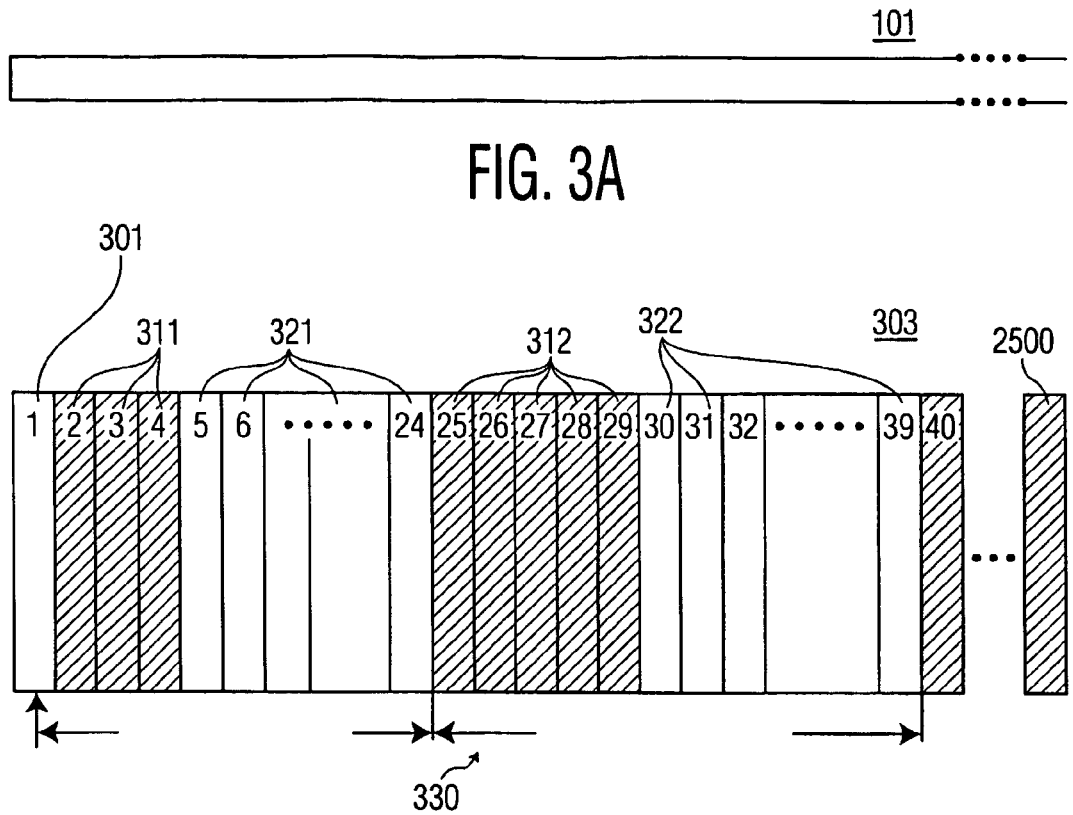
FIG. 3A
FIG. 3B
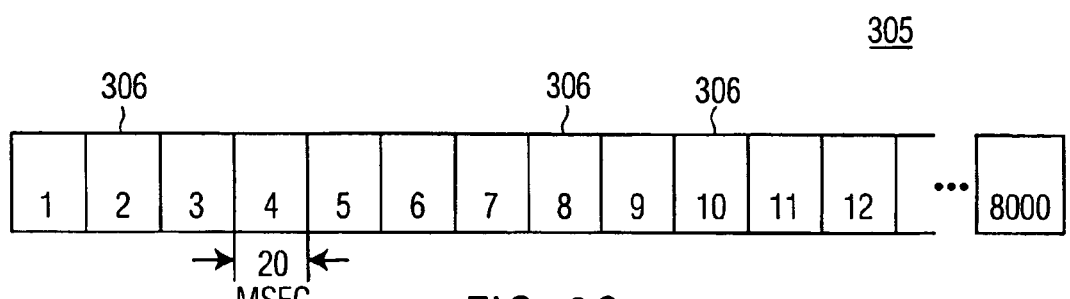
FIG. 3C
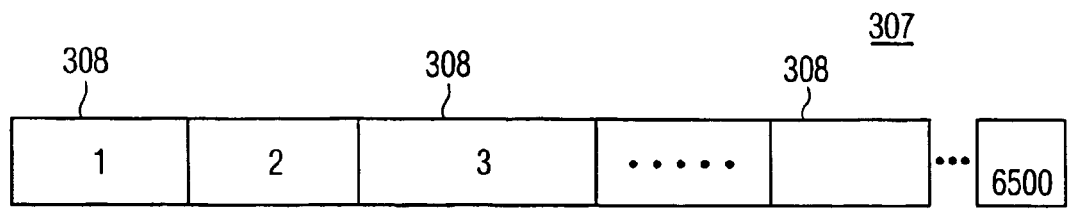
FIG. 3D

SYSTEM AND METHOD FOR GENERATING A MULTIMEDIA SUMMARY OF MULTIMEDIA STREAMS

CROSS REFERENCE TO RELATED APPLICATION

This application claims the benefit of U.S. provisional application Ser. No. 60/483,765 filed Jun. 30, 2003, which is incorporated herein by reference.

The present invention relates generally to the summarization of video or motion images, and in particular, to a system and method for providing a multimedia summary (video/audio/text) of a news broadcast to enable a user to better browse and decide on viewing the broadcast.

The amount of video content is expanding at an ever increasing rate. Simultaneously, the available time for viewers to consume or otherwise view all of the desirable video content is decreasing. The increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. The typical purpose for creating a video summarization is to obtain a compact representation of the original video for subsequent viewing.

Advances are being made continually in the field of automated story segmentation and identification, as evidenced by the BNE (Broadcast News Editor) and BNN (Broadcast News Navigator) of the MITRE Corporation (Andrew Merlino, Daryl Morey, and Mark Maybury, MITRE Corporation, Bedford Mass., Broadcast News Navigation using Story Segmentation, ACM Multimedia Conference Proceeding, 1997, pp. 381-389). Using the BNE, newscasts are automatically partitioned into individual story segments, and the first line of the closed-caption text associated with the segment is used as a summary of each story. Key words from the closed-caption text or audio are determined for each story segment that match the search words. Based upon the frequency of occurrences of matching keywords, the user selects stories of interest. Similar search and retrieval techniques are becoming common in the art. For example, conventional text searching techniques can be applied to a computer based television guide, so that a person may search for a particular show title, a particular performer, shows of a particular type, and the like.

A disadvantage of the traditional search and retrieval techniques is the need for an explicit search task, and the corresponding selection among alternatives based upon the explicit search. Often, however, a user does not have an explicit search topic in mind. In a typical channel-surfing scenario, a user does not have an explicit search topic. A channel-surfing user randomly samples a variety of channels for any of a number of topics that may be of interest, rather than specifically searching for a particular topic. That is, for example, a user may initiate a random sampling with no particular topic in mind, and select one of the many channels sampled based upon the topic that was being presented on that channel at the time of sampling. In another scenario, a user may be monitoring the television in a background mode, while performing another task, such as reading or cooking. When a topic of interest appears, the user redirects his focus of interest to the television, then returns his attention to the other task when a less interesting topic is presented.

Accordingly, a technique for automatically generating a multimedia summary that summarizes video, audio and text portions of a video stream (news broadcast) independent of a user having to explicitly use keywords to search for particular news topics, is highly desirable.

The present invention overcomes the shortcomings of the prior art. Generally, the present invention is directed to a system and method for generating a multimedia summary of one or more input video sequences that allows a user to better browse and/or decide on viewing the video sequences in their entirety. The multimedia summary is constructed automatically, based in part on system specifications, user specifications and network and device constraints. In a particular application of the invention, the input video sequences represent news broadcasts.

One feature of the invention is to create a multimedia summary of an input video stream which is suitable for use with a wide variety of devices that range from bandwidth constrained devices such as PDA's and cell phones to non-bandwidth constrained devices such as personal computers and multimedia workstations.

Another feature of the invention is to provide flexibility in the manner in which the multimedia summary is constructed. That is, the invention allows the user to customize the multimedia summary to suit the particular user's viewing preferences. More particularly, a user may provide one or more parameters specifying, for example, whether the multimedia summary is to be comprehensive or quick; whether the multimedia summary should include only a summary of a single lead story or a summary of the top lead stories; whether the summary should include only text, only audio or only video or combinations thereof. The user may also provide one or more keyword parameters, which will be utilized by the summarization system to select appropriate portions of text, audio and video from the input video stream for inclusion in the multimedia summary.

According to one aspect of the invention, a method for generating a multimedia summary of a news broadcast comprises the acts of: one of receiving and retrieving a multimedia stream comprising video, audio and text information; dividing the multimedia stream into a video sub-stream, an audio sub-stream and a text sub-stream; identifying video, audio and text key elements from said video, audio and text sub-streams, respectively; computing an importance value for the identified video, audio and text key elements identified at said identifying step; first filtering the identified video, audio and text key elements to exclude those key elements whose associated importance value is less than a pre-defined video, audio and text importance threshold, respectively; and second filtering the remaining key elements from said filtering step in accordance with a user profile; third filtering the remaining key elements from said second filtering step in accordance with network and user device constraints; and outputting a multimedia summary from the key elements remaining from said third filtering step.

Although this invention is particularly well suited to news broadcasts, the principles of this invention also allow a user to receive a multimedia summary of other types of broadcasts as well. For example, the invention is applicable to multimedia summaries of movie videos to allow a user to better browse and decide on viewing the movie in its entirety.

The invention also comprises an article of manufacture for carrying out the method. Other features and advantages of the invention will become apparent through the following detailed description, the drawings, and the appended claims, taken in conjunction with the accompanying drawings in which:

FIG. 3 illustrates an exemplary video stream of a typical news broadcast;

The present invention is directed to a system and method for summarizing one or more input multimedia streams via three modalities (video, audio, text).

It is to be understood that the exemplary system modules and methods described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and methods depicted in the accompanying Figures are preferably implemented in software, the actual connections between the system components (or the process acts) may differ depending upon the manner in which the present invention is programmed. Given the teachings herein, one of ordinary skill in the art will be able to contemplate or practice these and similar implementations or configurations of the present invention.

The present invention includes a computer program product which is a storage medium (media) having instructions stored thereon/in which can be used to program a computer to perform any of the processes of the present invention. The computer program product may also include data, e.g., input data, corresponding to any of the processes of the present invention. The storage medium can include, but is not limited to, any type of disk including floppy disks, optical discs, DVD, CD-ROMS, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of a general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Figure 1:
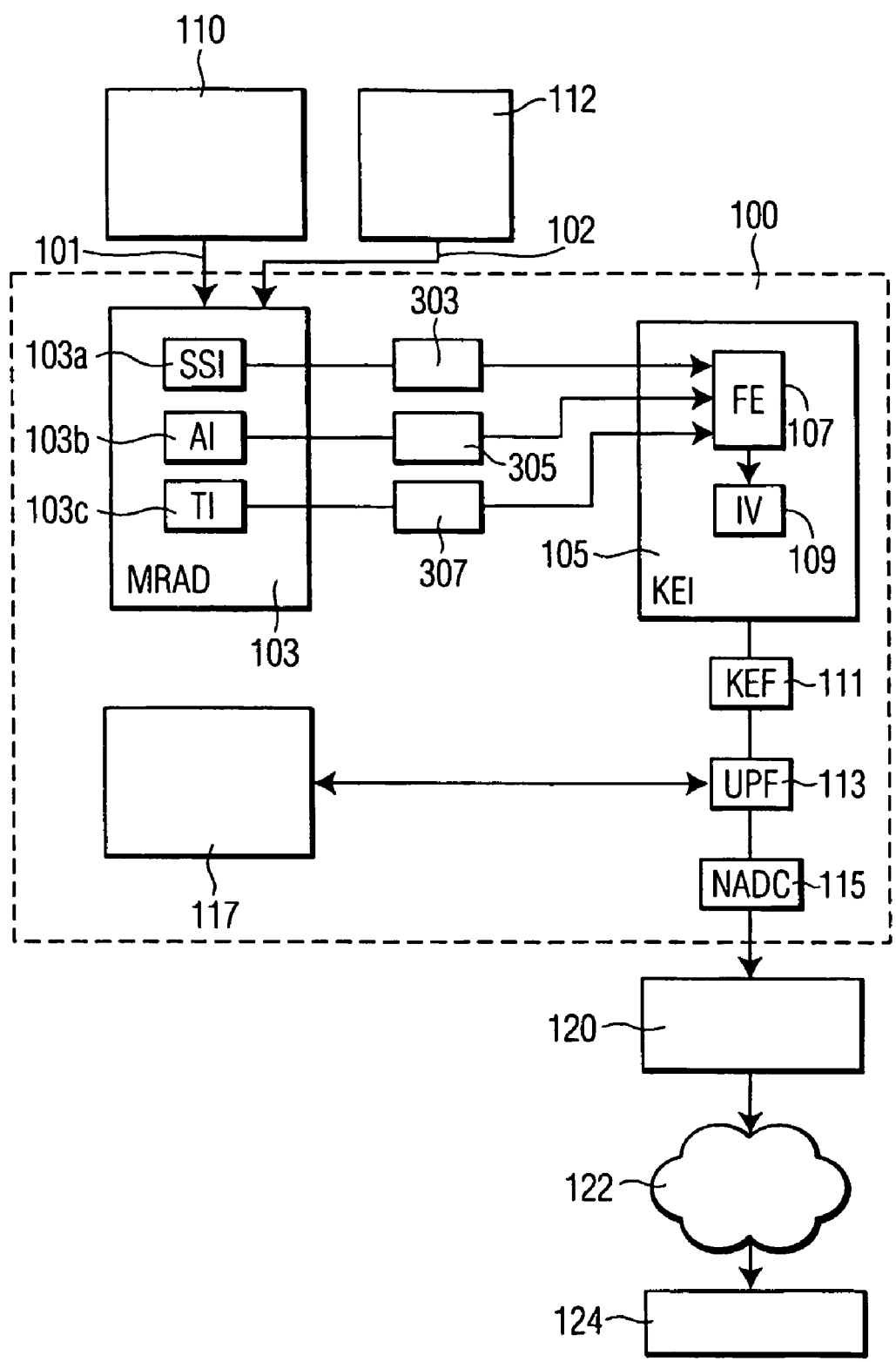
FIG. 1 is a schematic diagram of an overview of an exemplary embodiment of a multimedia summarization system in accordance with the present invention.

System Architecture:

With reference to FIG. 1, there is shown a schematic overview of one embodiment of a multimedia summarization system 100 in accordance with the present invention. By way of non-limiting example, the multimedia summarization system 100 will be presented in the context of a summarization system 100 for summarizing news stories, although the extensions of the principles presented herein to other multimedia applications as will be evident to one of ordinary skill in the art.

In the embodiment, shown in FIG. 1, multimedia summarization system 100 receives a multimedia stream 101 as input from a broadcast channel selector 110, for example a television tuner or satellite receiver. The system 100 may also retrieve a pre-stored multimedia stream 102 from a video storage vault 112. The system 100 may also receive input in the form of a video stream such as from a server on a network. The multimedia input streams 101, 102 may be in digital or analog form, and the broadcast may be any form of media used to communicate the streams 101, 102 including point to point communications. In the embodiment, shown in FIG. 1, the input multimedia streams 101,102, by way of non-limiting example, correspond to news broadcasts, and include multiple news stories with interspersed advertisements or commercials. The news broadcast could represent, for example, a particular news program such as, CNN Headline News, NBC Nightly News, etc.

In the embodiment, shown in FIG. 1, the multimedia summarization system 100, comprises a modality recognition and division (MRAD) module 103 for dividing the input multimedia streams 101, 102 into three modalities, referred to hereafter as a video sub-stream 303, audio sub-stream 305 and text sub-stream 307. The MRAD module 103 comprises a story segment identifier (SSI) module 103*a*, an audio identifier (AI) module 103*b*, and a text identifier (TI) module 103*c* for processing the input multimedia streams 101, 102 and outputting the video 303, audio 305, and text 307 sub-streams, respectively. The sub-streams 303, 305, 307 are output from the MRAD module 103 to a key element identifier (KEI) module 105 to identify key elements from within the respective sub-streams 303, 305, 307. The KEI module 105 comprises a feature extraction (FE) module 107, and an importance value (IV) module 109. The functionality of the KEI module 105 is described in further detail below in connection with FIGS. 4-7. The output of the KEI module 105 is coupled to the input of the key element filter (KEF) module 111 which filters the key elements identified by the KEI module 105, in a manner to be described below. The surviving key elements output from KEF 111 are provided as input to a user profile filter (UPF) 113 which further filters the surviving key elements in accordance with a pre-determined user preference. As shown, the UPF module 113 is coupled to one or more storage devices (i.e., a user preference database 117) for storing the pre-determined user preferences. The output of the UPF module 113 is coupled to the input of the network and device constraint (NADC) module 115, which may further filter the surviving key elements output from the UPF module 113 in accordance with the prevailing network conditions and user device constraints. The NADC module 115 outputs the multimedia summarization 120 of the invention. Typically the multimedia summary will be requested by a remote user, via a client device 124, interfacing with the summarization system 100 over a network 122 such as the Internet, intranet or any other suitable network. The client device 124 may be any electronic device operable to connect with and transmit data over the network 122. For example, the client device 124 may include a wired device, (e.g., a personal computer, workstation, or fax machine) or a wireless device (e.g., a laptop, personal digital assistant (PDA), mobile phone, pager, smartphone, wearable computing and communicating device or communicator).

Figure 2:
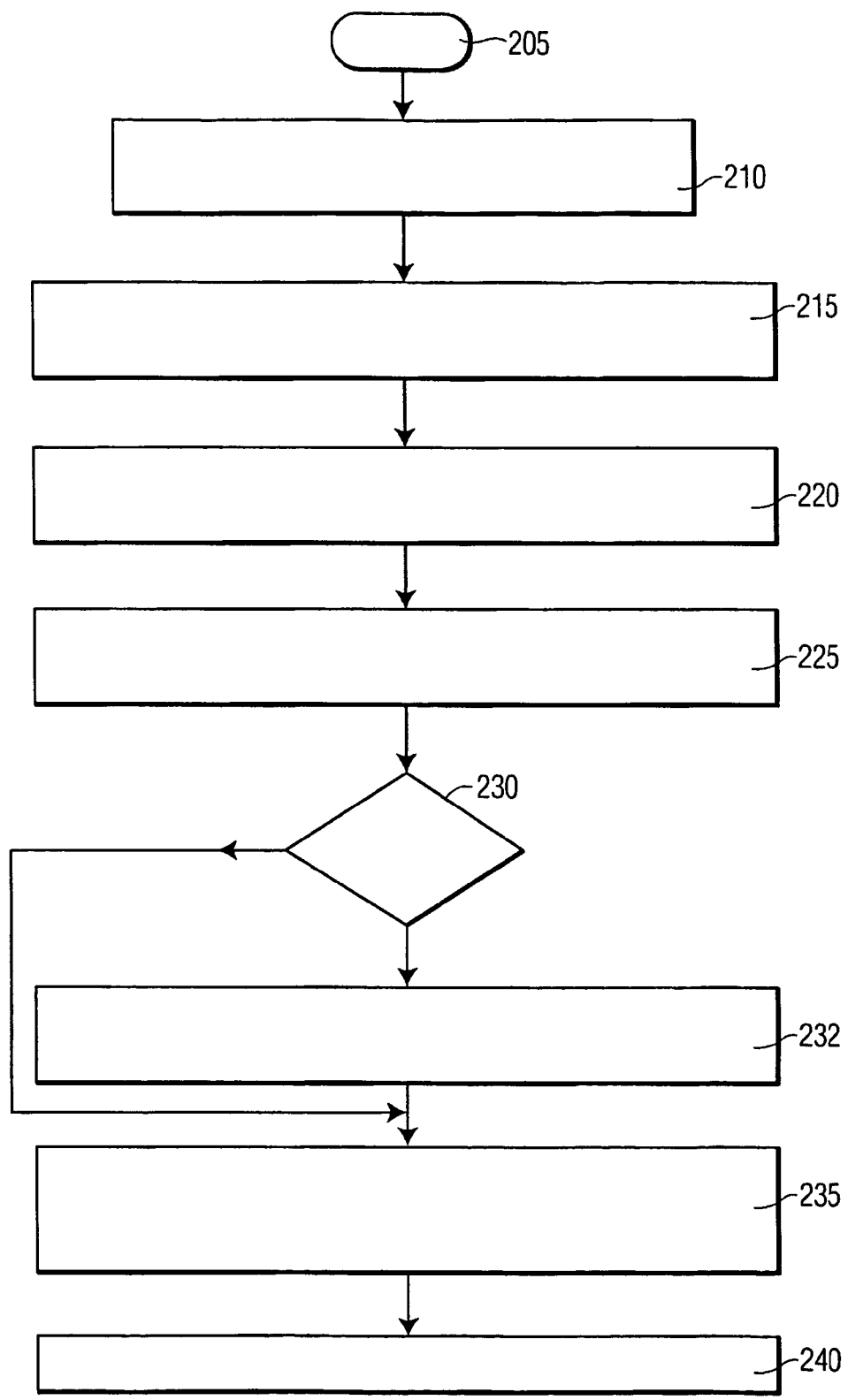
FIG. 2 is a flow diagram of a method of summarization in accordance with the present invention.

Operation:

An overview discussion of one embodiment of the multimedia summarization method of the present invention is now provided, with respect to FIGS. 1-3. Thereafter, more detailed descriptions of various acts associated with the described method will be provided further below.

FIG. 2 is a flow diagram illustrating a method of summarization according to one embodiment of the present invention:

At act 205, the process starts.

At act 210, the multimedia summarization system 100 retrieves and/or receives one or more multimedia streams 101, 102 (e.g., news broadcasts) as input.

At act 215, the retrieved/received input multimedia stream 101 is divided in accordance with three modalities (i.e., video, audio and text).

FIGS. 3a-3d illustrate, by way of example, how an input multimedia stream (e.g., stream 101) may be divided in accordance with the three modalities.

FIG. 3a is a general illustration of an input multimedia stream 101 (e.g., news broadcast 101) comprising video, audio and text components distributed throughout. As stated above, the news broadcast could represent, for example, a particular news program such as, CNN Headline News, NBC Nightly News, etc.

FIGS. 3b-3d illustrate how the input video stream 101 may be divided, according to the three modalities.

Referring first to 3b, in accordance with the video modality, a video sub-stream 303 is shown which represents the input multimedia stream 101 processed to highlight news story segmentation. The video sub-stream 303 of FIG. 3b is shown to be output from the story segment identifier (SSI) sub-module 103a of the MRAD module 103. The exemplary video sub-stream 303 is divided by the SSI sub-module 103a into a plurality of video frames (e.g., frames 1-25000) of which only 40 are shown for ease of explanation. The division is based on the typical construction of a news broadcast. That is, the typical news broadcast follows a common format that is particularly well suited for story segmentation. For example, a first or lead story could be related to political events in Washington, a second news story could be related to a worker strike or a building fire. For example, as shown in FIG. 3b, after an introduction frame 301 (frame 1), a newsperson, or anchor, typically appears 311 (anchor frames 2-4) and introduces a first reportage 321 (frames 5-24). The anchor frames 2-4 and news story segment frames 5-24 are collectively referred to as a first news story 311, 321. After the news story, the anchor reappears 312 (anchor frames 25-29) to introduce the second reportage 322 (frames 30-39), referred to collectively as the second news story 312, 322. The sequence of anchor-story-anchor, interspersed with commercials, repeats until the end of the news broadcast, e.g., frame 2500. The repeated appearances of the anchor 311, 312, . . . typically in the same staged location serves to clearly identify the start of each reportage segment segment and the end of the prior news segment or commercial. Also, as standards such as MPEG-7 are developed for describing video content, it can be expected that video streams will contain explicit markers that identify the start and end of independent segments within the streams.

One way of identifying news story segments is provided in EP Patent No. 1 057 129 A1, "Personalized Video Classification and Retrieval System" issued on Dec. 6, 2000 to Elenbaas, J H; Dimitrova, N; Mcgee, T; Simpson, M; Martino, J; Abdel-Mottaleb, M; Garrett, M; Ramsey, C; Desai, R., the entire disclosure of which is incorporated herein by reference.

Referring now to FIG. 3c, the audio sub-stream 305 is shown. Audio identification in the input multimedia stream 101 is relatively straight-forward in that the audio identifier sub-module 103b pre-selects an audio boundary, e.g., 20 ms, in the exemplary embodiment, and divides the input multimedia stream 101 into a plurality of 20 ms TIME frames 304 from start to finish to construct the audio sub-stream 305.

Referring again to FIG. 1, input multimedia stream 101 is received by the MRAD module 103 and processed by the audio identifier (AI) sub-module 103b to output the audio sub-stream 305.

Referring now to FIG. 3d, the text sub-stream 307 is shown. Text identification is relatively straight-forward in that the text identifier defines a frame 308 on word boundaries identified within the text sub-stream 307.

Referring again to FIG. 1, input multimedia stream 101 is received by the MRAD module 103 and processed by the text identifier (TI) sub-module 103c to output the text sub-stream 307. The video 303, audio 305 and text 307 sub-streams, output from the MRAD module 103, are thereafter provided as input streams to the key element identification KEI module 105.

At act 220, a key element identification analysis is performed by the KEI module 105 on the input sub-streams 301, 303, 305 to identify key elements within each respective sub-stream. A key element may be generally defined as a 'segment' of a sub-stream 303, 305, 307 that meets or exceeds a pre-determined criteria, as will be described further below.

At act 225, those key elements identified at act 220 are further filtered whereby only those key elements, whose computed importance value at act 220 which meet or exceed a pre-determined criteria are retained. The key element filter (KEF) module 111 of FIG. 1 performs this filtering process.

At act 230, the user profile filter (UPF) module 113 of FIG. 1 first determines whether the user has previously provided a user profile which is comprised of a number of user customization parameters, preferably stored in the user preference database 117. In act 232, if a user profile exists, it will be used to further filter those surviving key elements from act 225.

The user profile may be comprised of a number of user provided customization (preference) parameters. The parameters may be provided either at run time or preferably retrieved from the user preference database 117 by the UPF 109, to indicate particular customization preferences of the user regarding how the multimedia summary 120 is to be presented. In the case where the customization parameters are retrieved from the user preference database 117, users of the system will typically store their preferences with the system 100 during a configuration stage. The customization parameters determine to some extent how the multimedia summary 120 is to be customized to suit the user's particular viewing preferences.

The customization parameters provided by a user may include, for example:

whether the multimedia summary 120 is to be comprehensive or quick.

whether the multimedia summary 120 should include only text, audio, still images, video or combinations thereof.

Tasks to be performed such as browsing for new videos vs. recalling an already seen movie.

Venue where the summary 120 is to be viewed (i.e., context).

Time of day, week, month, year the multimedia summary 120 is being viewed.

One or more "keyword" customization parameters may be provided by the user to identify particular items of interest to the user (e.g., persons, places or things). As one example, a user may specify the keywords "Politics" and "Baseball" which will be used by the video summarization system 100 to locate news story segments which emphasize the selected keywords.

By way of example only, if a user prefers that the multimedia summary 120 be restricted to just an audio summary, then a highest rated audio segment can be chosen from the audio sub-stream 305 and presented to the user. As a further example, if the user prefers to view a quick multimedia summary 120 (e.g., a two-minute news summary), then the news stories that the user is interested in are chosen in accordance with the user profile preference and from within each selected news story only the highest rated video, audio and text segments are selected from the respective video 303, audio 305 and text 307 sub-streams to construct a time-constrained multimedia summary 120.

At act 235, those key elements surviving the previous act of user profile filtering are now further filtered by considering network and device constraints. Specifically, the Network and Device Constraint (NADC) module 113 considers any network bandwidth constraints of the network over which the multimedia summary 120 is to be transmitted and additionally considers those constraints associated with the user's viewing device. The surviving key elements from step 230 are modified in accordance with any known network and device constraints, as will be described.

In the typical case where the multimedia summary 120 is transmitted over a network, such as the Internet, the device constraints and available transmission bandwidth will dictate to some degree, the quality and quantity of the multimedia summary 120 to be transmitted. Due to the inherent bandwidth demands of video, the multimedia summary 120 will typically be constrained in the quality and/or quantity of the video portion of the multimedia summary 120. By comparison, the audio and text portions of a multimedia summary 120 will not suffer from similar constraints.

Wireless networks represent a typical limited bandwidth application. Such limited bandwidth conditions may exist due to either the direct technological constraints dictated by the use of a low bandwidth data channel or indirect constraints imposed on relatively high-bandwidth channels by high concurrent user loads. It is contemplated that the network bandwidth may be monitored in a transparent manner in real-time to determine the current state of the network. The multimedia summary may be modified in accordance with a prevailing network condition. For example, in the case of a congested network condition, the multimedia summary 120 may be constrained by limiting the video quality of each surviving key element from act 235.

With regard to device constraint considerations, cellular connected PDAs and webphones are examples of devices that are characteristically limited in processing power, display capabilities, memory, operating systems and the like. As a result of these limitations, these devices have different abilities to receive, process, and display video data. The multimedia summary 120 may be adjusted to accommodate the device constraints by limiting the video resolution, bit-rate, and so on.

If the user device is only capable of rendering text, then the highest ranking text segments are chosen for each of the news stories and sent out to the device.

At act 240, the multimedia summary 120 comprised of those key elements surviving act 235 are output to the user.

This discussion concludes the overview of the multimedia video summarization system and method. A more detailed description of the operation of various aspects of the method will now be provided.

A top-level description of an embodiment of the method of the invention has been provided above with reference to the flow diagram of FIG. 2 which includes, inter alia, act 220 which is directed to the identification of key elements from the respective video 303, audio 305 and text 307 sub-streams. A more detailed description of act 220, key-element identification is described now with reference to FIGS. 3-6.

Figure 4:
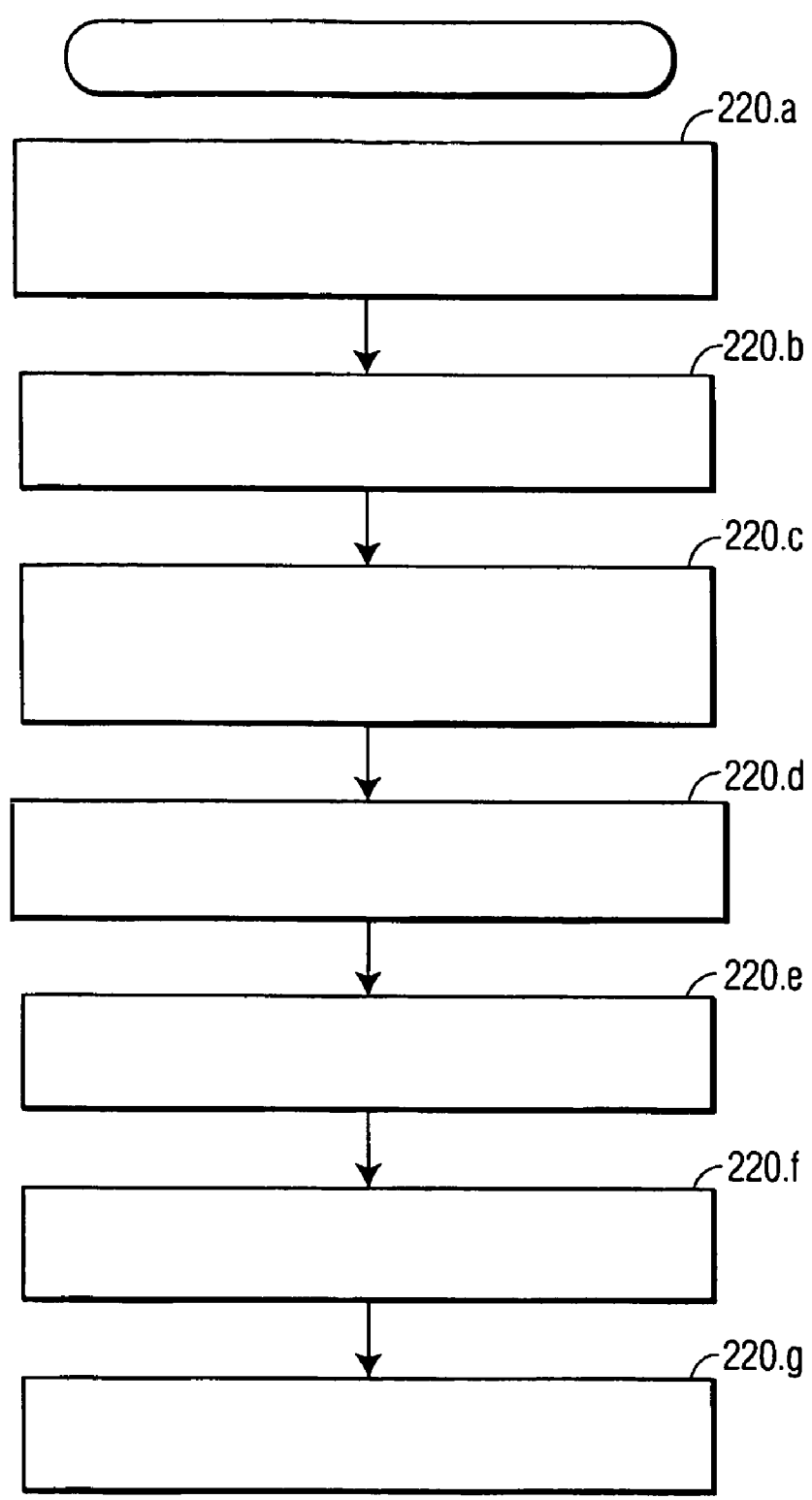
FIG. 4 is a flow diagram of a method of identifying key elements in accordance with the present invention.
Figure 5:
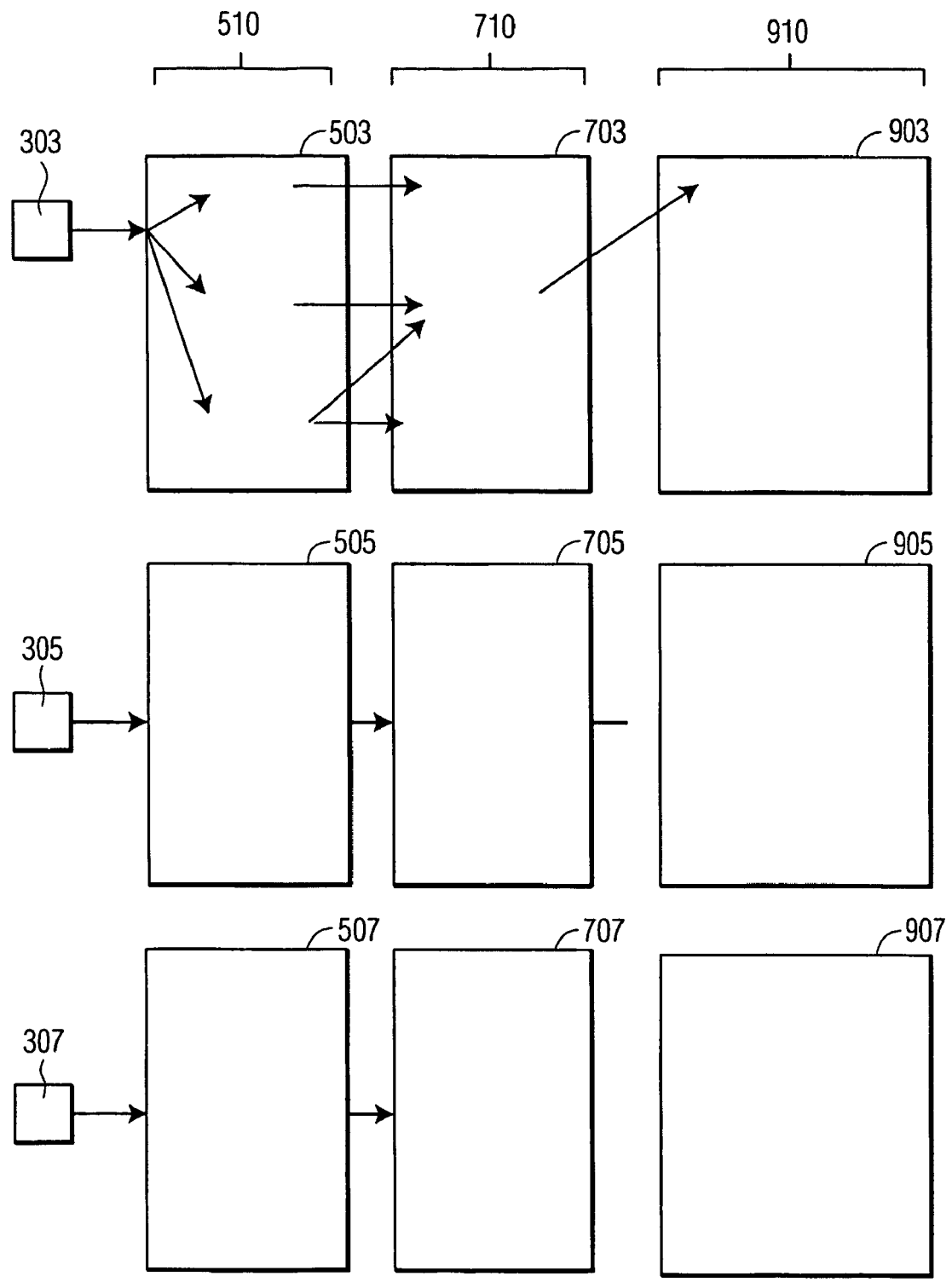
FIG. 5 illustrates an example block diagram of the process of feature extraction and derivation of features from an input multimedia stream.

Referring now to FIG. 4, which is a detailed flow diagram of the acts which comprise act 220 of the flow diagram of FIG. 2, and also referring to FIG. 5, which is a diagram further illustrating, by way of non-limiting example only, the process of feature extraction is described comprising the extraction and derivation of features, in each of the three modalities, from the respective sub-streams 303, 305, 307.

Act 220.*a*—Feature Extraction

At act 220.*a*, feature extraction is performed whereby low 510, mid 710 and high 910 level features are extracted from each frame in each of the respective video 303, audio 305 and text 307 sub-streams. With regard to the exemplary video sub-stream 303, feature extraction is performed in each of the 2500 video frames which make up the video sub-stream 303, 40 of which are shown for ease of explanation. Similarly, with regard to the audio sub-stream 305, feature extraction is performed in each of the 8000 audio frames 306 (FIG. 3*c*) which make up the audio sub-stream 305, 12 of which are shown for ease of explanation. In like manner, with regard to the text sub-stream 307, feature extraction is performed in each of the 6500 text frames 308 (FIG. 3*d*) which make up the text sub-stream 307, 5 of which are shown for ease of explanation.

Some examples of low, mid and high level features which may be extracted from the frames in each of the respective sub-streams (video, audio, text) are now described.

By way of non-limiting example only, the video-sub-stream may include the following low 503, mid 505 and high 507 level visual mode features:

Low level visual mode features 503 may include, inter alia, motion value (global motion for the frame or video segment), the total number of edges in a frame and dominant color.

Mid-level visual mode features are 703 derived from the extracted low level visual mode features 503 and may include, inter alia, family histograms, camera motion, frame detail, face, presence of overlaid text, and other object detectors.

High level visual mode features 903 are derived from the derived mid-level visual mode features and may include, inter alia, various video frame classifications such as an anchor frame, a reportage frame, an indoor frame, an outdoor frame, a natural frame, a graphics frame, a landscape frame and a cityscape frame.

By way of non-limiting example only, the audio sub-stream 305 may include the following low 505, mid 705 and high 905 level audio mode features:

Low-level audio mode features 505 may include, for example, MFCC, LPC, average energy, bandwidth, pitch etc.

Mid-level audio features 705 are derived from the extracted low level audio mode features 505 and may include, for example, classification of the audio into speech, music, silence, noise, speech+speech, speech+noise, and speech+music.

High level audio mode features 905 are derived from the previously derived mid-level audio mode features 705 and may include, inter alia, crowd cheering, speaking, laughing, explosions, sirens and so on. It could also include speech to text transcript.

By way of non-limiting example only, the text sub-stream 307 may include the following low 507, mid 707 and high 907 level text mode features:

Low-level text mode features 507 which may include, for example, the presence of keywords, cues, names, places etc.

Mid-level text mode features 707 are derived from the low level audio mode features 507 and may include, for example, topics, categories, important nouns.

High level text mode feature 907 are derived from the derived mid-level text mode 707 features and may include, inter alia, question/answer passages, an inference of who is speaking, i.e., news reporter v. anchor person v. guest and so on.

FIG. 5 is a diagram further illustrating, by way of non-limiting example only, the process of feature extraction comprising the extraction and derivation of features, in each of the three modalities, from the respective sub-streams 303, 305, 307. As shown, low level video features 510 such as edge, shape, color 503 are extracted from the video sub-stream 303. One or more of the extracted low level video features 503 may then be used to derive one or more mid-level features 703 such as videotext, faces, family histograms 703. The mid-level features 703 may then be used in turn to derive one or more high-level visual features 903 such as anchor frame, reportage frame, indoor frame, etc.

With reference to the mid-level visual feature, 'family histograms' shown as one element of 703, the derivation and use of this feature is of particular significance in that it is used to segment the video sub-stream 303 into 'segments' as will be described further below. Color is a dominant feature in video and helps in segmenting video from a perceptual point of view. Additionally, the duration of a family histogram also maps directly to the computed 'importance value' of a video segment, as will be described.

The process of deriving family histograms from the extracted low level visual features of the video sub-stream 303 involves an analysis of each video frame of the video sub-stream 303. The analysis is performed to quantize the color information of each video frame into color quantization bins. A simple 9-bin quantization color histogram was experimentally determined to be sufficient to identify the key elements. In a variation to this approach, a more complex 256-bin color histogram may be used depending upon the application. The simple 9-bin quantization color histogram approach assumes that there will only be slight differences in color variation from frame to frame for each family segment contained within a news story segment. This is true because there is presumed to be substantial frame similarity from frame to frame for a key element. While appreciable color variations, will occur from one frame to the next when a scene change occurs indicating the end of one family segment and the start of another. The color histogram approach detects the appreciable color variations (i.e., low level feature) by a sharp contrast in color histogram values from one frame to the next.

In order to find the degree of similarity between video frames, experiments were conducted with multiple histogram difference measures. In the family histogram computation act, for each video frame the histogram is computed and then a search is made of the previously computed family histograms to find the closest family histogram match. The comparison between the current histogram, $H_C$, and the previous family histograms, $H_P$, can be computed using one of the following methods for calculating the histogram difference D.

(1) Histogram difference using L1 distance measure is computed by using the following formula:

$$D = \sum_{i=1}^{N} |H_C(i) - H_P(i)| \qquad \text{EQ. [1]}$$

Here, N is the total number of color bins used (9 in our case). The values obtained using this formula range between 0 and twice the maximum number of pixels in respective images. Since we would like to obtain percentage of similarity we normalize the value by dividing with the total number of pixels. The normalized values are between 0 and 1, where values close to 0 mean that the images are similar, and those close to 1 mean that the images are dissimilar.

(2) Histogram difference using L2 distance measure is computed by using the following formula:

$$D = \sqrt{\sum_{i=2}^{N} (H_C(i) - H_P(i))^2} \qquad \text{Eq. [2]}$$

Similarly to case (1) we normalize the values of D.

(3) Histogram intersection is computed using the following formula:

$$I = \frac{\sum_{i=1}^{N} \min(H_C(i), H_P(i))}{\sum_{i=1}^{N} H_C(i)} \qquad \text{Eq. [3]}$$

The values obtained using this formula range between 0 and 1. The values close to 0 mean that the images are dissimilar and values close to 1 mean that the images are similar. In order to compare histograms with the same interpretation of similarity we use D=1−I as a distance measure.

(4) The Chi-Square test for two image histograms is computed by using the following formula:

$$I = \frac{\sum_{i=1}^{N} \min(H_C(i), H_P(i))}{\sum_{i=1}^{N} H_C(i)} \qquad \text{Eq. [4]}$$

In this case, the values range between 0 and the number of color bins, N, so we normalize with N, i.e. $D=\chi^2/N$.

(5) Bin-wise histogram intersection is computed using the following formula:

$$B = \sum_{i=1}^{N} \frac{\min(H_C(i), H_P(i))}{\max(H_C(i), H_P(i))} \qquad \text{Eq. [5]}$$

Similarly to histogram intersection, lower values mean dissimilarity and higher values mean that images are similar. To be consistent with the previous measures, the distance is computed using: D=1−B/N.

Color indexing methods that use histogram information are known in the art (see for example, the publication by M.

Stricker and M. Orengo, entitled, "Similarity of color images", In proc. Of IS&T/SPIE Conference on Storage and Retreival for Image and Video Database II, Vol. SPIE 2420, 1995.

Act 220.b—Assigning Feature Importance Values

At act 220.b, those mid 710 and high 910 level features extracted at act 220.a in each frame from each of the respective sub-streams 303, 305, 307 are now assigned a corresponding feature importance value. Discrete and/or continuous feature analysis methods may be employed to assign such importance values. In the discrete case, the feature analysis method outputs a discrete importance value indicating the presence or lack of presence of a feature (i.e., importance value=1 for present/0 for feature not present) or (importance value=1 for desirable for inclusion in the multimedia summary 120, 0 for not desirable in summary 120, and 0.5 if in between). As one example, because it is desirable to have 'faces' in the multimedia summary 120, a feature importance value of 1 may be assigned if one or two faces are present, a value of 0 may be assigned if no faces are present and a value of 0.5 may be assigned in the case where more than two faces are present. Another discrete example may be to assign a 0 for the presence of an anchor and a 1 for the presence of a reportage passage. Another discrete example may be to assign 0 for a frame if it belongs to a family histogram whose duration is smaller than n% of the total duration of the news story and otherwise assign a value of 1. Here n could be set to 10 etc.

With regard to the audio sub-stream 305, it may be desirable to have speech in the multimedia summary 120, so an importance value could be set to 1 for the presence of speech, 0 for noise and silence, 0.5 for {music, speech+music, speech+speech, speech+noise}.

With regard to the text sub-stream 307, if there is a name or important keyword present, then the importance value may be set to 1 otherwise it is set to 0.

In a continuous case, in the case of a family histogram, the importance value could be set to the duration of the segment a frame belongs to divided by the total duration of the news story.

Alternatively, in the continuous case, the feature analysis methods may employ a probability distribution to assign importance values to extracted features. The probability distribution gives the probability that the feature is present in the summary. The feature analysis methods used with this approach may output a probability value which can range from 0 to 1, indicating a degree of confidence regarding the presence of a feature.

The probability distribution for deriving importance values in the continuous case can be derived from a normal Gaussian distribution. Alternatively, the importance values could be also be mapped as Poisson, Rayleigh, or Bernoulli distributions. Equation (2) illustrates, by way of example, one way of computing the feature value for the frame as a normal Gaussian distribution.

$$P(s \mid \theta) = \sqrt{\frac{\theta_2}{2\pi}} \, e^{-(1/2)\theta_2(x-\theta_1)} \quad \text{Eq. (6)}$$

Where: S is the probability the feature is in the summary
θ generally represents any of the features; and
θ1 is the average of the feature value; and
θ2 is the expected deviation.

As one example, if "faces" represents a mid level video feature to be considered, i.e., represented as θ in equation (6), then very small and very large faces will rarely appear. Most often, whenever a "face" appears in the video stream, it is typically present at a height of substantially 50% of the screen height. In this case $\theta_1$ is equal to 0.5 (the mean) and $\theta_2$ is equal to 0.2, for example. It is noted that a maximum likelihood estimation approach can be used to determine the parameters $\theta_1$ and $\theta_2$.

It is noted that each of the features can potentially raise or lower the importance value of a key element for potential selection in the multimedia summary 120.

220.c—Compute Importance Values Per Frame in Each Modality

At act 220.c, based on the feature importance values computed at act 220.b, frame importance values are computed. To determine the frame importance values, either a weighted sum approach or polling of the importance values of the extracted features may be utilized, as will be described.

Tables 1, 2 and 3 illustrate by way of non-limiting example only, the feature importance values computed at act 220.b for each of the extracted features identified at act 220.a in each of the respective modalities (video, audio, text). The importance values are used to compute the importance value per frame. The table column headings represent previously extracted and derived low, mid and high level features such as edges, color, faces, silence, indoor frame and so on.

TABLE 1

Visual Feature probabilities

|  | Visual feature I | Visual feature II | Visual feature III | ... | Visual feature N |
|---|---|---|---|---|---|
| Frame 1 | .8 | .6 | .9 |  | .1 |
| Frame 2 | .5 | .3 | .4 |  | .4 |
| Frame 3 | .6 | .5 | .8 |  | .9 |
| . |  |  |  |  |  |
| . |  |  |  |  |  |
| Frame A | .2 | .001 | .4 |  | .3 |

TABLE 2

Audio Feature probabilities

|  | Audio feature I | Audio feature II | Audio feature III | ... | Audio feature M |
|---|---|---|---|---|---|
| Time 1 | .5 | .6 | .9 |  | .1 |
| Time 2 | .15 | .83 | .4 |  | .4 |
| Time 3 | .6 | .5 | .8 |  | .9 |
| . |  |  |  |  |  |
| . |  |  |  |  |  |
| Time B | .2 | .001 | .4 |  | .3 |

TABLE 3

Text Feature probabilities

|  | Text feature I | Text feature II | Text feature III | ... | Text feature O |
|---|---|---|---|---|---|
| Word 1 | .5 | .6 | .9 |  | .1 |
| Word 2 | .15 | .83 | .4 |  | .4 |
| Word 3 | .6 | .5 | .8 |  | .9 |
| . |  |  |  |  |  |
| . |  |  |  |  |  |
| Word C | .2 | .001 | .4 |  | .3 |

The table values are combined in a manner to be described to provide a measure of how much a frame is "worth". A frame's "worth" is a measure of the frame's significance for possible inclusion in the multimedia summary 120. A frame's "worth" may be computed in any number of ways including, deterministically, statistically and via conditional probabilities.

Deterministic Computation of a Frame's 'Worth'

In one embodiment, a frame's 'worth' may be computed as a deterministic linear function of low, mid, and high level video features, computed as:

$$\text{Key\_Element\_Importance} = \Sigma w_i f_i \quad \text{Eq. (7)}$$

Where: $f_i$ is a value of a particular low, mid or high level feature in the feature vector; and $w_i$ is a weight for that feature.

The features $f_i$ could be low level features such as motion value (global motion for the frame or video segment), total number of edges, dominant color, and mid level features such as family importance, camera motion, frame detail, face size, overlaid text box size. High level feature can be a classification such as anchor/reportage, indoor/outdoor scenes, natural/graphics, and landscape/cityscape. The feature list is not exhaustive and is only provided as exemplary of the types of features which may be included in the importance value computation.

It is noted that the weights, $w_i$, associated with each feature can be determined a-priori by the summarization system 100 or alternatively determined in accordance with a user preference. For example, if a user wants to hear music in the multimedia summary 120, then a weight value for music can be set to 1. As another example, if the user prefers not to see any videotext in the summary, the absence of videotext in a frame is given importance of 1 and so on.

It is assumed that for each of the modalities, the feature importance values are combined in some manner to output a key element importance value per frame using either a single probabilistic or deterministic function which results in a list such as the non-limiting exemplary list shown in Table 4:

TABLE 4

Importance value (per frame) for different modalities

| Visual Frame label | Visual Importance/ per frame | Audio Frame label | Audio Importance/ per frame | Text Frame label | Text Importance/ per frame |
|---|---|---|---|---|---|
| Frame 1 | .8 | Time 1 | .6 | Word 1 | .1 |
| Frame 2 | .5 | Time 2 | .3 | Word 2 | .4 |
| Frame 3 | .6 | Time 3 | .5 | Word 3 | .9 |
| Frame 4 | | Time 4 | | Word 4 | |
| Frame N | .2 | Time M | .001 | Word P | .3 |

In yet another embodiment, a frames 'worth' may be computed by finding the conditional probability using a Bayesian Belief Network Pattern Classification. Bayesian Belief Network Pattern Classification is known in the art. See for example, Bayesian Belief Network Pattern Classification (2nd Edition) by Richard O. Duda, Peter E. Hart, David G. Stork, the entire disclosure of which is incorporated by reference herein in its entirety.

220.d—Segment Creation

At act 220.d, having compiled the frame importance values for each frame in each modality at 220.c, the frame importance values are used to combine or group the frames into segments for each modality.

Creating Visual Segments

To create visual segments from the respective video frames (i.e., Frame 1, Frame 2, . . . , Frame N) which make up the video sub-stream 303, either a family histogram computation is performed or via shot change detection. One way of combining frames into segments is by using shot change detection. Shot change detection is well known and disclosed in U.S. Pat. No. 6,125,229, 26 Sep. 2000, also issued as EP 0 916 120 A2, 19 May 1999 issued to Dimitrova, N; Mcgee, T; Elenbaas, J H, Visual Indexing System, the entire disclosure of which is incorporated herein by reference. Another way of visual segments from the respective video frames of the video sub-stream 303 is through the use of family histograms, as discussed above.

Creating Audio Segments

Figure 6:
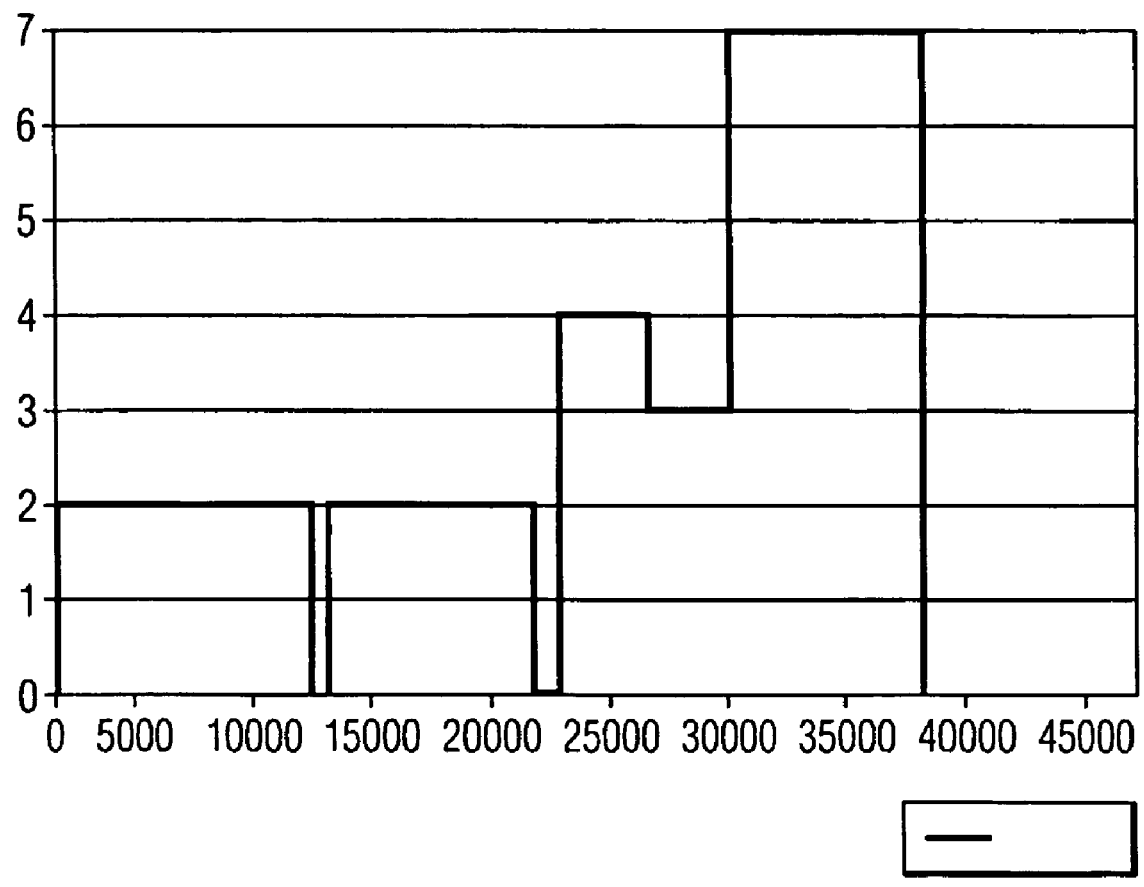
FIG. 6 is a graph illustrating how the time elements which comprise the audio sub-stream may be grouped to form segments.

To create audio segments from the respective TIME frames (i.e., TIME 1, TIME 2, and so on) which make up the audio sub-stream 305, the segment boundaries can be the boundaries of different classifications. That is, an audio classifier, classifies audio into speech (1), music(2), silence(3), noise (4), speech+speech(5), speech+noise(6), and speech+music (7). FIG. 6 is a graph illustrating, by way of example, how the time elements which comprise the audio sub-stream 305 of FIG. 3 may be grouped to form segments. The graph plots audio classification v. time frames (time frame [x]). As shown, the initial frames (frames 1-20,000) are mostly classified as music (2) frames. After which, successive frames are mostly classified as noise frames (4), followed by speech and music frames (7).

The details of audio classification are further described in "Classification of general audio data for content-based retrieval", Pattern Recognition Letters Vol. 22, number 5, pages 533-544 (2001), Dongge Li, Ishwar K. Sethi, Nevanka Dimitrova, incorporated by reference herein in its entirety.

Creating Text Segments

To create text segments, the segment boundaries could be defined to be sentence boundaries based on the punctuation provided in the closed caption portion of the input video sequence 101, 102.

220.e—Segment Importance Value Determination

Segment importance value determination may be performed in one way by averaging the frame importance values of the frames which comprise each segment to generate a single ranking or score. Another way of computing a segment importance value determination is to take the highest frame importance value within the segment and assigning it to the whole segment.

220.f—Segment Ranking

At act 220.e, a segment ranking (score) is computed for each segment identified at step 220.d in each of the respective modalities. In addition, the ranked segments are sorted in order of importance based on the computed ranking or score.

Table 6 illustrates, by way of example, how the video segments (col. 1) and their associated segment importance values (col. 2) are ranked. Tables 7 and 8 show a similar construction for the audio and text modalities, respectively.

TABLE 6

Visual Segment Importance Ranking

| Segment | Visual Importance Value | Ranking |
|---|---|---|
| Frames 1–6 | .8 | 1 |
| Frames 26–30 | .6 | 2 |

TABLE 6-continued

Visual Segment Importance Ranking

| Segment | Visual Importance Value | Ranking |
|---|---|---|
| Frames 7–25 | .5 | 3 |
| . | | |
| . | | |
| . | | |
| Frame (N-23)-N | .2 | N |

TABLE 7

Audio Segment Importance Ranking

| Segment | Audio Importance Value | Ranking |
|---|---|---|
| Frames 30–45 | .9 | 1 |
| Frames 10–29 | .8 | 2 |
| Frames 100–145 | .6 | 3 |
| . | | |
| . | | |
| . | | |
| Frame (N-10)-N | .2 | J |

TABLE 8

Text Segment Importance Ranking

| Segment | Text Importance Value | Ranking |
|---|---|---|
| Frames 5–65 | .9 | 1 |
| Frames 13–25 | .7 | 2 |
| Frames 26–29 | .6 | 3 |
| . | | |
| . | | |
| . | | |
| Frame (N-100)-N | .2 | K |

220.g—Key Element Identification.

At act 220.f, key elements are identified based on the segment rankings of act 220.e.

Figure 7A:
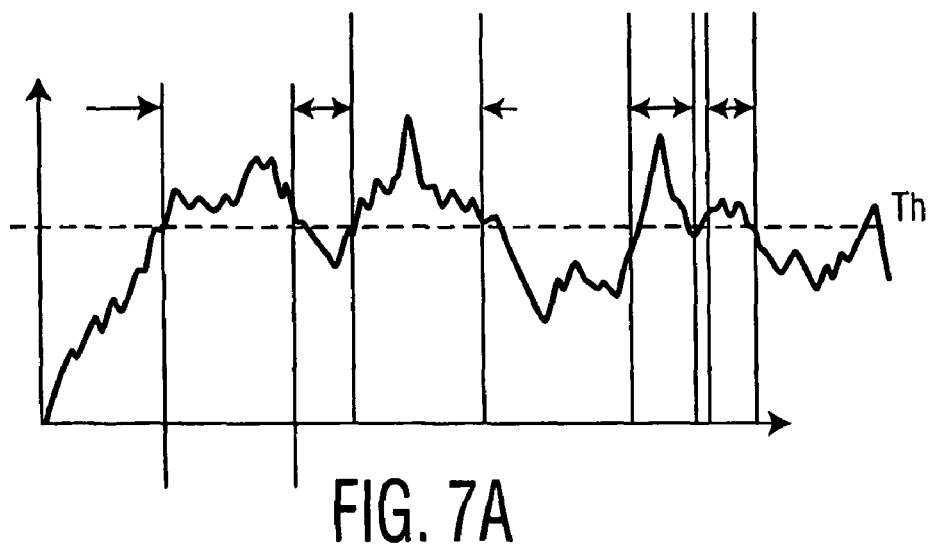
FIGS. 7*a-c* are graphs illustrating various ways of identifying key elements.
Figure 7B:
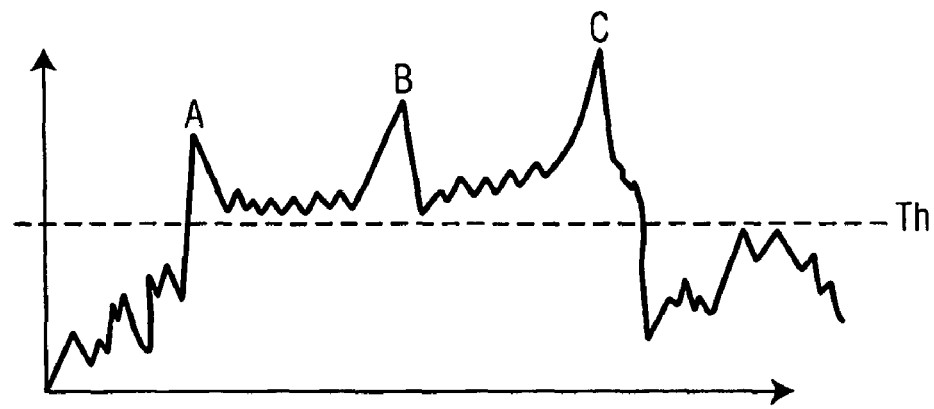
Figure 7C:
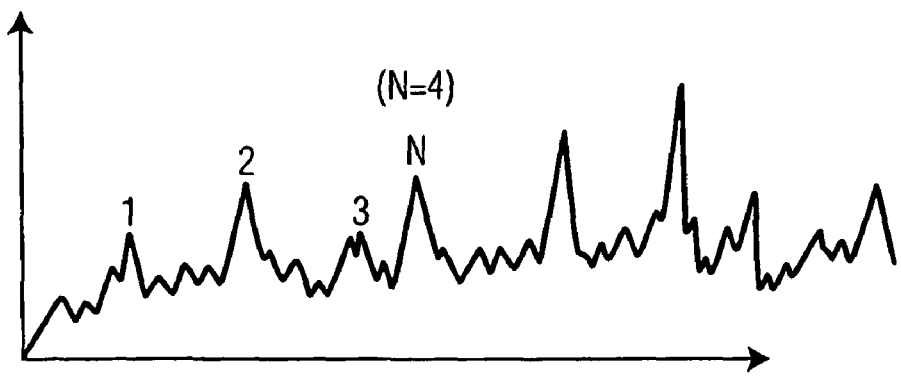

FIGS. 7a-c illustrate by way of example, several ways of identifying key elements. By way of example, FIGS. 7a-c are graphs of (frame importance value per) v. (segment) which could represent any of the modalities discussed above, i.e., Tables 6, 7 or 8.

FIG. 7a is a graph illustrating a first method of identifying key elements. Key elements are identified by selecting any segment which appears above a pre-determined threshold.

FIG. 7b is a graph illustrating a second method of identifying key elements. Key elements are identified by selecting the local maxima, i.e., "A", "B", "C", which appear above a pre-determined threshold, Th.

FIG. 7c is a graph illustrating a third method of identifying key elements. Key elements are identified by selecting the first N local maxima without consideration for a threshold criteria.

It is noted that the process of identifying key elements described above and illustrated with reference to FIGS. 7a-c, may be further modified in accordance with a user viewing profile. It is well known that recommendation systems generally operate by recommending items to particular users based on information known about the users. Typically such systems develop profiles of customers based on the customer's previous viewing or buying habits. In the present context, a user's viewing profile can be created and preferably stored in the user preference database 117 along with other user profile data discussed above. The user's viewing profile may then be used to create a mapping function for mapping the previously described graph of (importance value) v. (segment), as illustrated in FIGS. 7a-c, to a second function which accounts for the client's viewing preferences. This process is optional and may be implemented for any or all of the modalities.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for producing a multimedia summary of at least one multimedia stream the summary comprising key elements selected from said at least one multimedia stream, the method comprising:
   a.) one of receiving and retrieving said at least one multimedia stream comprising video, audio and text information;
   b.) dividing the at least one multimedia stream into a video substream, an audio sub-stream and a text sub-stream;
   c.) identifying for potential inclusion in the summary video, audio and text key elements from said video, audio and text sub-streams, respectively;
   d.) computing an importance value for the identified video, audio and text key elements identified at said step (c);
   e.) first filtering the identified video, audio and text key elements to exclude those key elements whose associated importance value is less than a pre-defined video, audio and text importance threshold, respectively; and
   f.) second filtering the remaining key elements from said step (e) in accordance with a user profile;
   g.) third filtering the remaining key elements from said step (f) in accordance with network and user device constraints; and
   h.) outputting a multimedia summary which comprises key elements remaining from said step (g).

2. The method of claim 1, wherein said at least one multimedia stream is one of an analog and digital multimedia stream.

3. The method of claim 1, wherein the step of dividing the at least one multimedia stream into a video sub-stream further comprises the step of identifying and grouping said at least one multimedia stream into a plurality of news stories where each identified news story is comprised of an anchor portion and a reportage portion.

4. The method of claim 1, wherein the step of dividing the at least one multimedia stream into an audio sub-stream further comprises dividing said at least one multimedia stream into a plurality of equal-sized frames of a fixed time duration.

5. The method of claim 1, wherein the step of dividing the at least one multimedia stream into a text sub-stream further comprises dividing said at least one multimedia stream into a plurality of frames wherein each frame of said plurality of frames is defined on a word boundary.

6. The method of claim 1, wherein the act of identifying video, audio and text key elements from said video, audio and text sub-streams further comprise the acts of:
   1.) identifying low, mid and high level features from the plurality of frames which comprise said video, audio and text, substreams;
   2.) determining an importance value to each of said extracted low, mid and high level features from said identifying act;

3.) computing a frame importance value for each of said plurality of frames which comprise said video, audio and text sub-streams as a function of the importance values of the feature importance values determined at said determining act;
4.) combining the frames into segments in each of said video, audio and text sub-streams;
5.) computing an importance value per segment for each segment from said combining act;
6.) ranking the segments based on said computed importance value at said computing step; and
7.) identifying key elements based on said ranked segments.

7. The method of claim 6, wherein said act (3). of computing a frame importance value for each of said extracted low, mid and high level features further comprises computing said importance value by one of deterministic, statistical and conditional probability means.

8. The method of claim 7, wherein said conditional probability means comprises computing said frame importance value as one of a Gaussian, Poisson, Rayleigh and Bernoulli distribution.

9. The method of claim 8, further comprising computing the Gaussian distribution according to the equation:

$$P(s \mid \theta) = \sqrt{\frac{\theta_2}{2\pi}} \, e^{-(1/2)\theta_2(x-\theta_1)}$$

where: $\theta$ is any of the features;
$\theta_1$ is the average of the feature value; and
$\theta_2$ is the expected deviation.

10. The method of claim 7, wherein said deterministic means comprises computing said frame importance value according to the equation:

$$\Sigma w_i f_i$$

where: $f_i$ represent low, mid-level and high-level features; and
$w_i$ represent weighting factors for weighting said features.

11. The method of claim 6, wherein said step (4) of combining the frames into video segments further comprises combining said frames by one of family histogram computation means and shot change detection means.

12. The method of claim 6, wherein said step (4) of combining the frames into audio segments further comprises the steps of:
categorizing each frame from said audio sub-stream as one of a speech frame, a music frame, a silence frame, a noise frame, a speech + speech frame, a speech + noise frame and a speech + music frame; and
grouping consecutive frames having the same categorization.

13. The method of claim 6, wherein act step (4) of combining the frames into text segments further comprises combining said frames based on punctuation included in said text sub-stream.

14. The method of claim 6, wherein said step (5) of computing an importance value per segment further comprises averaging the frame importance values for those frames which comprise said segment.

15. The method of claim 6, wherein said step (5) of computing an importance value per segment further comprises using the highest frame importance value in said segment.

16. The method of claim 6, wherein said step (7) of identifying key elements based on said rankings further comprises identifying key elements whose segment ranking exceeds a predetermined segment ranking threshold.

17. The method of claim 6, wherein said step (7) of identifying key elements based on said rankings further comprises identifying key elements whose segment ranking both exceeds a predetermined segment ranking threshold and constitute a local maxima.

18. The method of claim 6, wherein said step (7) of identifying key elements based on said rankings further comprises identifying key elements whose segment ranking constitutes a local maxima.

19. A system for producing a multimedia summary of at least one multimedia stream, the summary comprising key elements selected from said at last one multimedia stream, the system comprising: a modality recognition and division (MRAD) module comprising a story segment identifier (SSI) module, an audio identifier (AI) module and a text identifier (TI) module, the MRAD module communicatively coupled to a first external source for receiving said at least one multimedia stream, the MRAD module communicatively coupled to a second external source for receiving said at least one multimedia stream, the MRAD module dividing said at least one multimedia stream into a video, an audio and a text sub-stream and outputting said video, audio and text sub-streams to a key element identifier (KEI) module, the KEI module comprising a feature extraction (FE) module and an importance value (IV) module for identifying key elements from within said video, audio and text sub-streams and assigning importance values thereto, the KEI module communicatively coupled to a key element filter (KEF) for receiving the identified key elements and filtering said key elements that exceed a pre-determined threshold criteria, the KEF module communicatively coupled to a user profile filter (UPF) for receiving filtered key elements and further filtering said filtered key elements in accordance with a user profile, the UPF module communicatively coupled to a network and device constraint (NADC) module, said NADC module receiving said further filtered key elements and further filtering said further filtered key elements in accordance with network and/or user device constraints, the NADC module outputting a multimedia summary of said at least one multimedia stream which comprises key elements remaining after said further filtering in the NADC module.

20. The system of claim 19, further comprising a user preference database communicatively coupled to said UPF module for storing user profiles.

21. The system of claim 19, wherein the first external source is a broadcast channel selector.

22. The system of claim 19, wherein the first external source is a video streaming source.

23. The system of claim 19, wherein said at least one multimedia stream is one of an analog and digital multimedia stream.

24. The system of claim 19, wherein the NADC module is communicatively connected to an external network coupled to a user device.

25. The system of claim 19, wherein the network is the Internet.

26. A non-transitory computer readable medium having computer readable code means embodied thereon, said computer readable program code means comprising: an act of one of receiving and retrieving said at least one multimedia stream comprising video, audio and text information; an act of dividing said at least one multimedia stream into a video sub-stream, an audio sub-stream and a text sub-stream an act of identifying for potential inclusion in the summary video, audio and text key elements from said video, audio and text sub-streams, respectively; an act of computing an importance value for the identified video, audio and text key elements identified at said identification act; an act of first filtering the identified video, audio and text key elements to exclude those key elements whose associated importance value is less than a pre-defined video, audio and text importance threshold, respectively; and an act of second filtering the remaining key elements from said first filtering act in accordance with a user profile; an act of third filtering the remaining key elements from said second filtering act in accordance with network and user device constraints; and an act of outputting a multimedia summary which comprises key elements remaining from said third filtering act.

27. A non-transitory computer readable medium of claim 26 further wherein the act of identifying video, audio and text key elements from said video, audio and text sub streams, respectively, further comprises: an act of identifying low, mid and high level features from the plurality of frames which comprise said video, audio and text sub-streams; an act of determining an importance value to each of said extracted low, mid and high level features from said identifying act; an act of computing a frame importance value for each of said plurality of frames which comprise said video, audio and text sub-streams as a function of the importance values of the feature importance values determined at said determining step; an act of combining the frames into segments in each of said video, audio and text sub-streams; an act of computing an importance value per segment for each segment from said combining act; an act of ranking the segments based on said computed importance value at said computing act; and an act of identifying key elements based on said ranked segments.

* * * * *

UNITED STATES PATENT AND TRADEMARK OFFICE
CERTIFICATE OF CORRECTION

PATENT NO. : 7,738,778 B2  Page 1 of 1
APPLICATION NO. : 10/562538
DATED : June 15, 2010
INVENTOR(S) : Agnihotri et al.

It is certified that error appears in the above-identified patent and that said Letters Patent is hereby corrected as shown below:

IN THE CLAIMS

In claim 10, at column 17, Line 39, delete "$f_1$", and insert therefore, --$f_i$--.

In claim 10, at column 17, Line 41, delete "$w_1$" and insert therefore, --$w_i$--.

In claim 19, at column 18, Line 14, delete "last" and insert therefore, --least--.

Signed and Sealed this

Twenty-fourth Day of August, 2010

David J. Kappos
*Director of the United States Patent and Trademark Office*